United States Patent
Anzai et al.

(10) Patent No.: US 7,310,428 B2
(45) Date of Patent: Dec. 18, 2007

(54) METHOD OF DETECTING DIGITAL WATERMARK INFORMATION

(75) Inventors: Kousuke Anzai, Kawasaki (JP); Isao Echizen, Yokohama (JP); Hiroshi Yoshiura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 806 days.

(21) Appl. No.: 10/411,217

(22) Filed: Apr. 11, 2003

(65) Prior Publication Data
US 2004/0008865 A1 Jan. 15, 2004

(30) Foreign Application Priority Data
Apr. 17, 2002 (JP) ............................ 2002-114803

(51) Int. Cl.
*G06K 9/00* (2006.01)
(52) U.S. Cl. ...................................... 382/100; 382/232
(58) Field of Classification Search ................ 382/100, 382/232; 348/460, 463
See application file for complete search history.

(56) References Cited

U.S. PATENT DOCUMENTS 5,946,414 A * 8/1999 Cass et al. .................. 382/183

6,647,125 B2 * 11/2003 Matsumoto et al. ........ 382/100

FOREIGN PATENT DOCUMENTS

JP 2001-53955 2/2001
WO PCT/US99/03338 * 11/1999

* cited by examiner

*Primary Examiner*—Bhavesh M Mehta
*Assistant Examiner*—Hadi Akhavannik
(74) *Attorney, Agent, or Firm*—Mattingly, Stanger, Malur & Brundidge, P.C.

(57) ABSTRACT

The present invention can detect watermark information from motion picture of various scanning methods and various picture sizes without causing increase of a memory capacity.

A watermark information detection apparatus 1 converts encoded watermarked motion picture 4 into standard motion picture 5 having the smallest data size among the assumed kinds of motion picture. Further, the watermark information detection apparatus 1 scales a standard coordination system that is utilized for specifying embedding locations of a watermark pattern. Then, with respect to each field of the standard motion picture 5, watermark information is detected from predetermined locations specified in the scaled standard coordinate system by the watermark pattern.

6 Claims, 9 Drawing Sheets

| | | POST-CHANGE MOTION PICTURE | | | |
|---|---|---|---|---|---|
| | | PROGRESSIVE METHOD 1920 × 1080 DOTS | INTERLACE METHOD 1920 × 1080 DOTS | PROGRESSIVE METHOD 720 × 480 DOTS | INTERLACE METHOD 720 × 480 DOTS |
| PRE-CHANGE MOTION PICTURE | PROGRESSIVE METHOD 1920 × 1080 DOTS | CHANGE PATTERN (1) X:100.0% Y:100.0% | CHANGE PATTERN (2) X:100.0% Y:50.0% | CHANGE PATTERN (3) X:37.5% Y:44.4% | CHANGE PATTERN (4) X:37.5% Y:22.2% |
| | INTERLACE METHOD 1920 × 1080 DOTS | CHANGE PATTERN (5) X:100.0% Y:200.0% | CHANGE PATTERN (1) X:100.0% Y:100.0% | CHANGE PATTERN (6) X:37.5% Y:88.9% | CHANGE PATTERN (3) X:37.5% Y:44.4% |
| | PROGRESSIVE METHOD 720 × 480 DOTS | CHANGE PATTERN (7) X:266.7% Y:225.0% | CHANGE PATTERN (8) X:266.7% Y:112.5% | CHANGE PATTERN (1) X:100.0% Y:100.0% | CHANGE PATTERN (2) X:100.0% Y:50.0% |
| | INTERLACE METHOD 720 × 480 DOTS | CHANGE PATTERN (9) X:266.7% Y:450.0% | CHANGE PATTERN (7) X:266.7% Y:225.0% | CHANGE PATTERN (5) X:100.0% Y:200.0% | CHANGE PATTERN (1) X:100.0% Y:100.0% |

FIG.5

| | | |
|---|---|---|
| | | STANDARD MOTION PICTURE 5 |
| | | INTERLACE METHOD<br>720 × 480 DOTS |
| MOTION PICTURE 3 | PROGRESSIVE METHOD<br>1920 × 1080 DOTS | CHANGE PATTERN (4)<br>X:37.5%<br>Y:22.2% |
| | INTERLACE METHOD<br>1920 × 1080 DOTS | CHANGE PATTERN (3)<br>X:37.5%<br>Y:44.4% |
| | PROGRESSIVE METHOD<br>720 × 480 DOTS | CHANGE PATTERN (2)<br>X:100.0%<br>Y:50.0% |
| | INTERLACE METHOD<br>720 × 480 DOTS | CHANGE PATTERN (1)<br>X:100.0%<br>Y:100.0% |

METHOD OF DETECTING DIGITAL WATERMARK INFORMATION

INCORPORATION BY REFERENCE

This application claims priority based on a Japanese patent application No. 2002-114803 filed on Apr. 17, 2002, the entire contents of which are incorporated herein by reference.

BACKGROUND OF THE INVENTION

The present invention relates to a technique of digital watermark (herein-after "watermark") for a motion picture.

Watermark technique is drawing more attention from the viewpoint of copyright protection for digital data such as a motion picture. Watermark technique is technique of embedding specific information in digital data according to predetermined rules such that the mentioned specific information can-not be extracted from the digital data at least without using the mentioned predetermined rules. For example, according to predetermined rules, information on a purchaser or the like of image data is embedded in an invisible form into the motion picture itself. When the image data is copied illegally, a person who has copied illegally can be specified by using the predetermined rules to extract the embedded information from the illegally copied data.

As well as still image data, motion picture can be an object of embedding watermark information. In that case, it is considered that watermark information is embedded in field data as a constituent of motion picture.

However, there exist various scanning methods and various picture sizes for motion picture. As a scanning method, there exist an interlace method in which 2 fields are scanned to give 1 frame, or a progressive method in which 1 field is scanned to give 1 frame, or the like. Further, as a frame size, there exist 352×240 dots employed for example by MPEG (Moving Picture Experts Group)-1, 720×480 dots employed for example by MPEG-2, 1920×1080 dots, or the like.

In order that watermark information can be detected correctly for motion picture of all scanning methods and all picture sizes, it is necessary to determine a memory capacity for storing field data used in detection of watermark information, considering a scanning method and picture size for which a field data size becomes biggest. Accordingly, the memory capacity becomes large, and hardware size of an apparatus for detecting watermark information becomes large.

Further, there is a possibility that, in the distribution process, motion picture is variously changed in scanning method and picture size, for example. It is required that watermark information is detected correctly even from motion picture that has been subjected to such changes. In this respect, Japanese Unexamined Patent Laid-Open No. 2001-053955 proposes a technique of correctly detecting watermark information from image data that has been subjected to geometric transformation.

However, when this technique is used to detect watermark information from modified motion picture, detection algorithm becomes more complex as the number of scanning methods and the number of picture sizes become larger, and accordingly, a processing time required for detection of the watermark information becomes longer. For example, when motion picture on the market employ either the interlace method or the progressive method as a scanning method and a picture size of either 720×480 dots or 1920×1080 dots, there exist a plurality of patterns of changes that may be made in the distribution process. The number of patterns depends on the product of the number (2×2=4) of combinations of a scanning method and a picture size employable in embedding watermark information into motion picture and the number (2×2=4) of combinations of a scanning method and a picture size employable by the motion picture at the time of detecting the watermark information. Thus, when it is tried to detect watermark information assuming every change pattern, as the number of scanning methods and the number of picture sizes are larger, the number of change patterns increases at a squared rate and a processing time required for detecting the watermark information becomes longer.

SUMMARY OF THE INVENTION

The present invention has been made taking the above-described state into consideration. According to the present invention, it is possible to detect watermark information from motion picture of various scanning methods and various picture sizes without increasing a memory capacity. Further, the present invention can rapidly detect watermark information from such motion picture.

In the present invention, watermark information is detected from motion picture of any scanning method and any picture size, with the watermark information being embedded in the motion picture by changing fields constituting the motion picture at pixel blocks positioned at predetermined locations in a certain coordinate system.

First, the motion picture is converted into motion picture (referred to as standard motion picture) of a predetermined scanning method and a predetermined picture size (a conversion step). Then, the watermark information is detected from fields constituting the standard motion picture, by using the certain coordinate system transformed with scale factors determined from the scanning method and picture size at the time of embedding the watermark information in the motion picture and the scanning method and picture size of the standard motion picture (a detection step).

Here, in the conversion step, when the any scanning method is a progressive method and the predetermined scanning method is an interlace method, conversion from the motion picture of the any scanning method into the motion picture of the predetermined scanning method is performed by reducing a vertical direction of the fields of the motion picture of the any scanning method to half. Further, when the any scanning method is an interlace method and the predetermined scanning method is a progressive method, the conversion from the motion picture of the any scanning method into the motion picture of the predetermined scanning method is performed by magnifying twice the vertical direction of the fields of the any scanning method.

Further, in the detection step, for example, when the scanning method employed at the time of embedding the watermark information in the motion picture is same as the scanning method for the standard motion picture and the picture size at the time of embedding the watermark information in the motion picture is twice as long as the picture size of the standard motion picture in both horizontal and vertical directions, the watermark information is detected from the fields constituting the standard motion picture, using a coordinate system obtained by reducing the certain coordinate system to half in the horizontal and vertical directions. Further, for example, when the scanning method employed at the time of embedding the watermark information in the motion picture is a progressive method while the scanning method of the standard motion picture is an interlace method, and the picture size at the time of embedding the watermark information in the motion picture is same as the picture size of the standard motion picture, the watermark information is detected from the fields constituting the standard motion picture, using a coordinate system obtained by reducing the certain coordinate system to half in the vertical direction.

In the present invention, motion picture is converted into standard motion picture before detecting watermark information. Accordingly, by employing a scanning method and picture size that make the data size of field data smaller, as the scanning method and picture size of the standard motion picture, a memory capacity for storing field data with the intention of detecting the watermark information can be made smaller, and thus, hardware size of the watermark information detection apparatus can be made smaller.

When the motion picture is changed in its scanning method and/or picture size, and contents of the change are not known, the detection step may be performed as follows.

Namely, the process of specifying the pixel blocks positioned at the predetermined locations in the certain coordinate system and the process of judging whether information is embedded in those pixel blocks by comparing data values of the specified pixel blocks with a reference value are performed while transforming the certain coordinate system to change the predetermined locations in the fields, until it is confirmed that the information is embedded in those pixel blocks.

In the present invention, the standard motion picture can employ one combination of a scanning method and a picture size. The number of change patterns for finally changing the motion picture into the standard motion picture is same as the number of combinations of scanning methods and picture sizes that the motion picture can employ at the time of embedding watermark information. Accordingly, in trying detection of watermark information assuming each of the change patterns, the number of the change patterns become smaller in comparison with the conventional techniques. Thus, the processing time required for detecting the watermark information can be made shorter.

As described above, according to the present invention, watermark information can be detected with respect to motion picture of various scanning methods and picture sizes without causing increase of memory capacity. Further, watermark information can be detected rapidly from such motion picture.

These and other benefits are described throughout the present specification. A further understanding of the nature and advantages of the invention may be realized by reference to the remaining portions of the specification and the attached drawings.

DETAILED DESCRIPTION OF THE PREFERRED EMBODIMENTS

Now, one embodiment of the present invention will be described.

Figure 1:
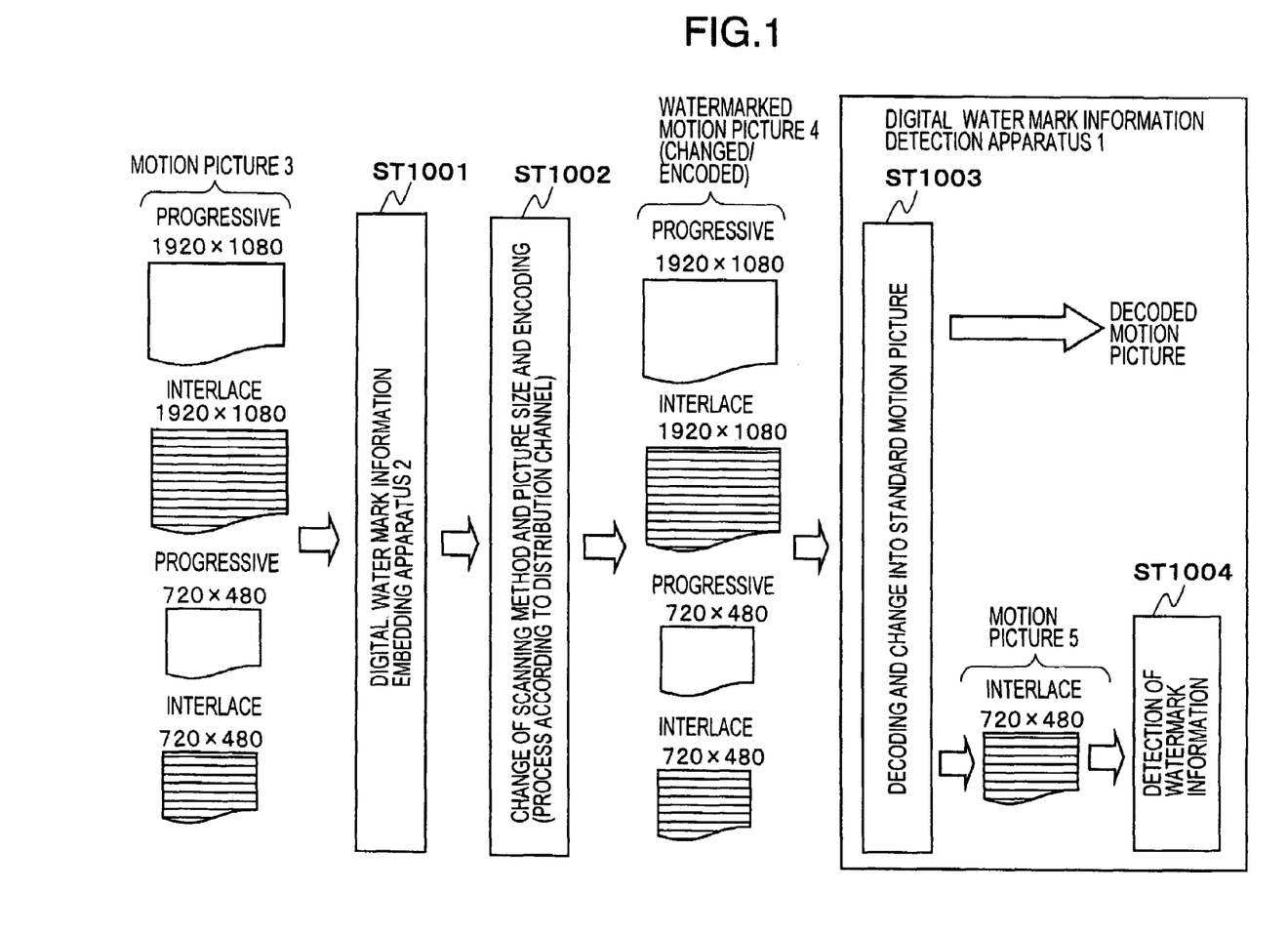
FIG. 1 is a diagram for explaining motion picture as a processing object of watermark information detection apparatus according to one embodiment of the present invention.

FIG. 1 is a diagram for explaining motion picture as a processing object of a watermark information detection apparatus according to the present embodiment.

As a motion picture scanning method employed at the time of embedding watermark information, the present embodiment assumes two kinds of methods, i.e., the interlace method in which 2 fields are scanned to give 1 frame and the progressive method in which 1 field is scanned to give 1 frame. Further, as a motion picture's picture size employed at the time of embedding watermark information, the present embodiment assumes two kinds of picture sizes, i.e., 720×480 dots and 1920×1080 dots. Accordingly, kinds of motion picture 3 inputted into a watermark information embedding apparatus 2 are a 1920×1080 dot progressive method, a 1920×1080 dot interlace method, a 720×480 dot progressive method, and a 720×480 dot interlace method, i.e., four kinds in total.

The watermark information embedding apparatus 2 embeds watermark information by changing pixel blocks (each having, n pixels×m pixels) positioned at predetermined locations in a certain coordinate system (hereinafter, referred to as a standard coordinate system) with respect to each of the fields constituting inputted motion picture 3 or with respect to fields arranged at predetermined intervals in those fields constituting the inputted motion picture 3. Then, the watermark information embedding apparatus 2 outputs the watermarked motion picture generated in this way (ST1001). Generally, a rule of determining the predetermined locations in the standard coordinate system is called a watermark pattern.

Figure 2:
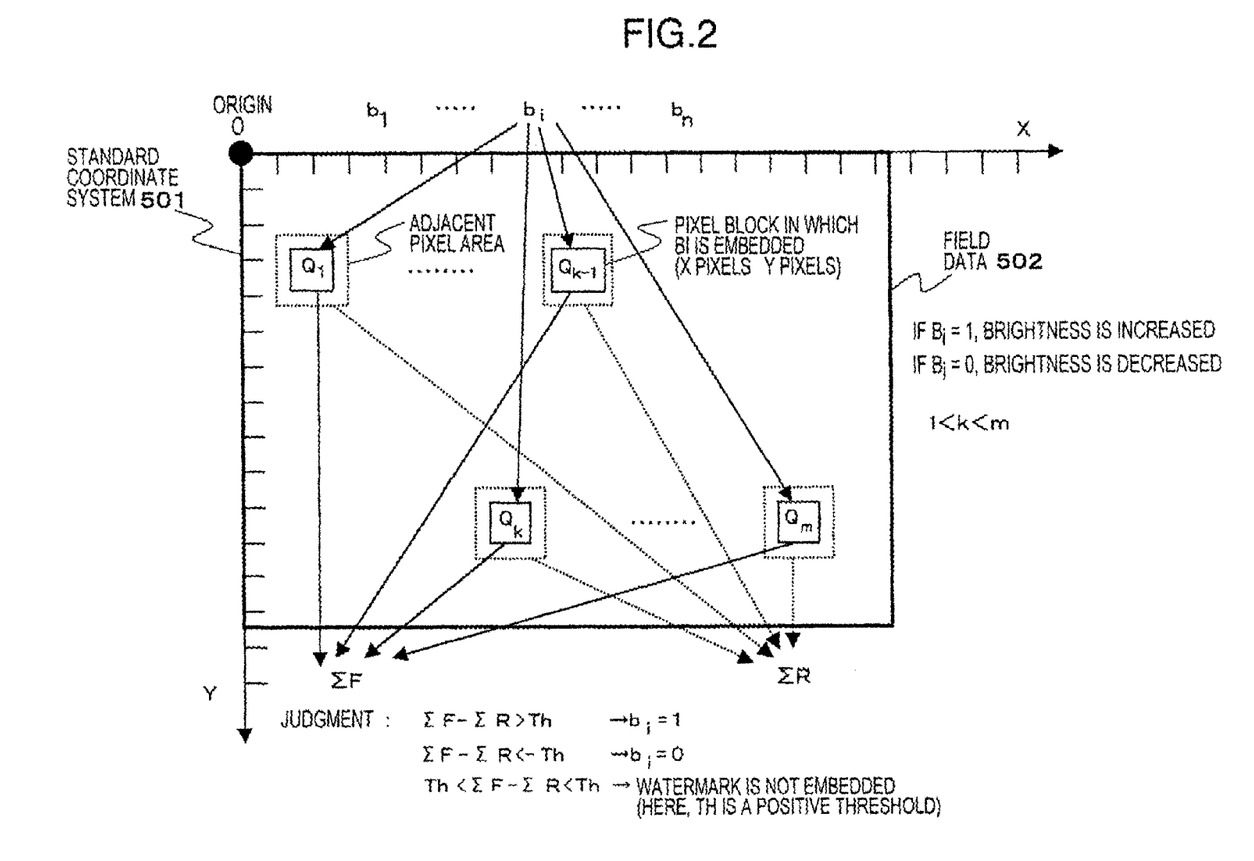
FIG. 2 is a diagram for explaining principles of information embedding/extraction process used in one embodiment of the present invention for embedding and extracting information into/from field data by the watermark technique.

Now, there will be described principles of information embedding/extraction process for embedding and extracting information into and from field data by the watermark technique. FIG. 2 is a diagram for explaining the principles of information embedding/extraction process for embedding and extracting information into/from field data by the watermark technique.

As shown in the figure, in the information embedding process, for a bit $b_i$ ($0 \leq i \leq n$) of the bits $b_1$-$b_n$ constituting the information to be embedded, brightness of each piece of data of pixel blocks $Q_1$-$Q_m$ (each having x pixels×y pixels) positioned, in the standard coordinate system 501, at the predetermined locations 1-m specified by a watermark pattern is changed to be increased by U when the bit in question is "1" or to be decreased by U when the bit in question is "0". This process is performed for all the bits $b_1$-$b_m$, by changing embedding locations, so that the watermark information is embedded in the field data 502.

On the other hand, in the extraction process for extracting thus-embedded watermark information, for a bit bi ($0 \leq i \leq n$) of the bits $b_1$-$b_n$ constituting the embedded information, the sum total S of average pixel brightness in the pixel blocks Q1-Qm at the predetermined locations 1-m specified by the watermark pattern in the standard coordinate system 501, and the sum total R (Reference value) of average pixel brightness in adjacent areas respectively adjacent to the pixel blocks Q1-Qm at the predetermined locations 1-m are detected. When S-R>T (where T varies depending on an error rate required, and, for example, T≧U×m (i.e., the number of blocks in which bi is embedded), it is judged that $b_i$=1. When S-R<-T, it is judged that $b_i$=0. And, when -T<S-R<T, it is judged that information is not embedded in the pixel blocks $Q_1$-$Q_m$ positioned at the predetermined locations specified by the watermark pattern in the standard coordinate system 501. This process is performed for all the bits $b_1$-$b_n$, to extract the watermark information embedded in the field data 502.

However, as described below, the present embodiment considers a possibility that watermarked motion picture is modified with respect to its scanning method and picture size in a later stage. And, the present embodiment is designed such that watermark information can be detected correctly even from such modified watermarked motion picture.

Now, returning to FIG. 1, thus-generated watermarked motion picture is changed in its scanning method and picture size according to a distribution channel, and encoded before distribution (ST1002). For example, in the case of motion picture distribution utilizing a narrow-band network, the progressive method or interlace method of 720×480 dots is employed. On the other hand, in the case of motion picture distribution utilizing a broad-band network, the progressive method or interlace method of 1920×1080 dots is employed. The present embodiment assumes that the same four kinds of watermarked motion picture 4 are distributed as the four kinds (the 1920×1080 dot progressive method, the 1920×1080 dot interlace method, 720×480 dot progressive method, and the 720×480 dot interlace method) of motion picture 3 inputted into the watermark information embedding apparatus 2.

Figure 3:
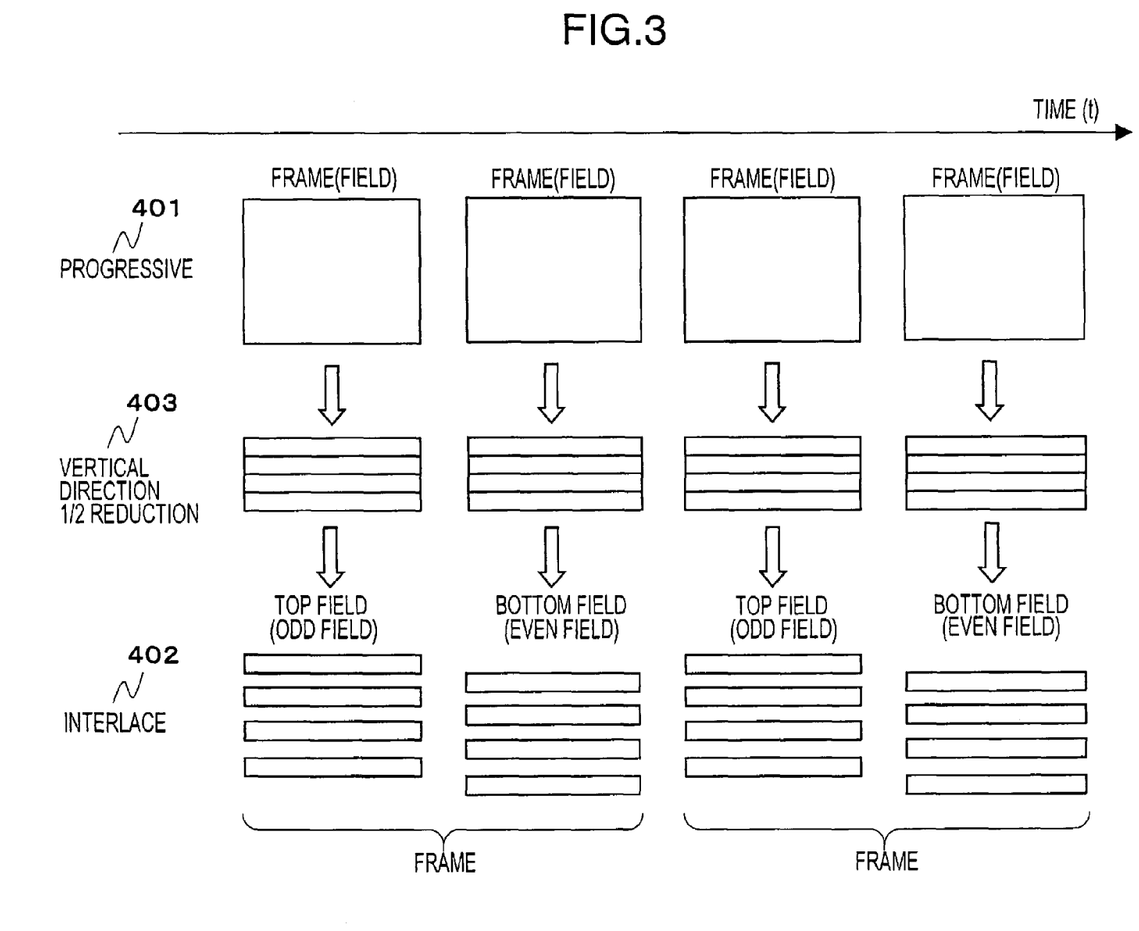
FIG. 3 is a diagram for explaining principles of process used in one embodiment of the present invention for changing the scanning method of motion picture from a progressive method to an interlace method.

Here, a change from a progressive method to an interlace method is realized by reducing the vertical direction of each field of motion picture to half. FIG. 3 is a diagram for explaining principles of process for changing the scanning method of motion picture from a progressive method to an interlace method.

As described above, in the progressive method, 1 field constitutes 1 frame (401). On the other hand, in the interlace method, 2 fields (a tope (odd) field and a bottom (even) field) constitute 1 frame (402). Accordingly, the vertical direction of each field (i.e., frame) as a constituent of motion picture of the progressive method is reduced to ½ (403). Thus-obtained fields are each set alternately as a top field or a bottom field as a constituent of the motion picture of the interlace method.

On the other hand, a change from an interlace method to a progressive method is realized by the reverse process. Namely, the vertical direction of each field as a constituent of motion picture of the interlace method is magnified twice, and thus-obtained each field is set as a field (frame) as a constituent of the motion picture of the progressive method.

Further, a change of a picture size is realized by scaling a pre-change field in the horizontal and vertical directions by respective scale factors determined from ratios of the pre-change horizontal and vertical sizes to the post-change ones.

Figure 4:
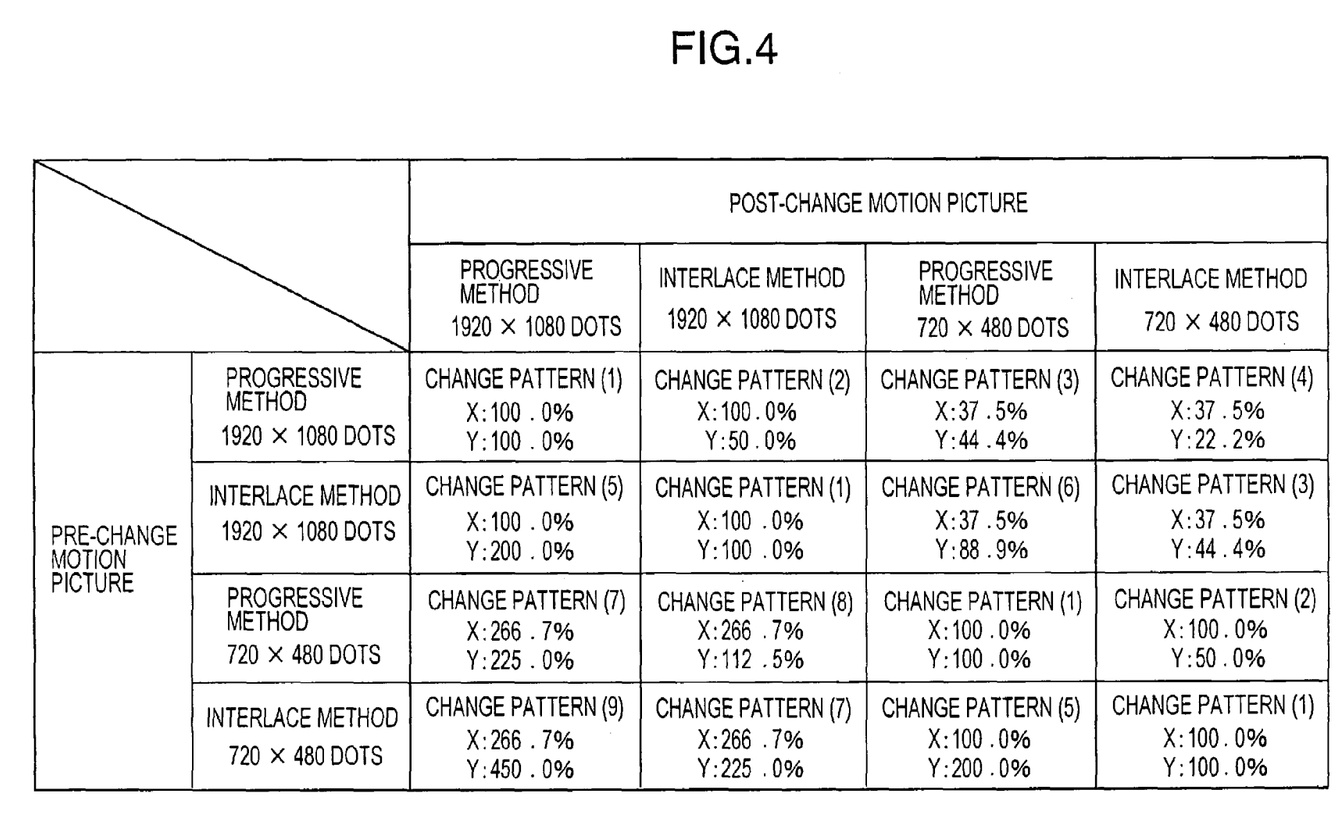
FIG. 4 is a diagram showing a list of scale factors in the horizontal (X) and vertical (Y) directions, which are employed to change each field of motion picture due to a change in the distribution process.

FIG. 4 shows a list of scale factors in the horizontal (X) and vertical (Y) directions, which are employed to change each field of motion picture. In this example, the kinds of pre-change motion picture are four, i.e., the 1920×1080 dot progressive method, the 1920×1080 dot interlace method, the 720×480 dot progressive method, and the 720×480 dot interlace method, and the kinds of post-change motion picture are four, i.e., the same as the pre-change motion picture. In this case, the number of possible combinations (referred to as change patterns) of scale factors in the X and Y directions is nine (change patterns (1) to (9)).

Now, returning to FIG. 1, the watermark information detection apparatus 1 receives watermarked motion picture 4 through the above-described distribution process. Then, the watermark information detection apparatus 1 decodes the watermarked motion picture 4, and, at the same time, converts the decoded watermarked motion picture 4 into standard motion picture 5 of a predetermined scanning method and a predetermined picture size (ST1003). In the present embodiment, standard motion picture 5 is the 720×480 dot interlace type.

Then, according to the extraction principles described referring to FIG. 2, the watermark information detection apparatus 1 tries to extract watermark information from each constituent field of the standard motion picture 5. Until the watermark information is extracted, this process is performed by scaling the standard coordinate system 501, which is utilized by the watermark pattern to specify the embedding locations, using scale factors determined from a relation between the scanning method and picture size that are probably employed for the motion picture 3 inputted into the watermark information embedding apparatus 2 and the scanning method and picture size of the standard motion picture 5 (here, the number of possible combinations of scale factors are same as the kinds of motion picture 3 inputted into the watermark embedding apparatus 2).

As described above, as the kinds of the motion picture 3 inputted into the watermark information embedding apparatus 2, the present embodiment assumes four kinds, i.e., the 1920×1080 dot progressive method, the 1920×1080 dot interlace method, the 720×480 dot progressive method, and the 720×480 dot interlace method. Accordingly, the four kinds (the change patterns (1) to (4)) shown in FIG. 5 can be considered as the combinations of scale factors in the horizontal (X) and vertical (Y) directions used to change the motion picture 3 inputted into the watermark information embedding apparatus 2 to the standard motion picture 5 of the 720×480 dot interlace method.

Figure 5:
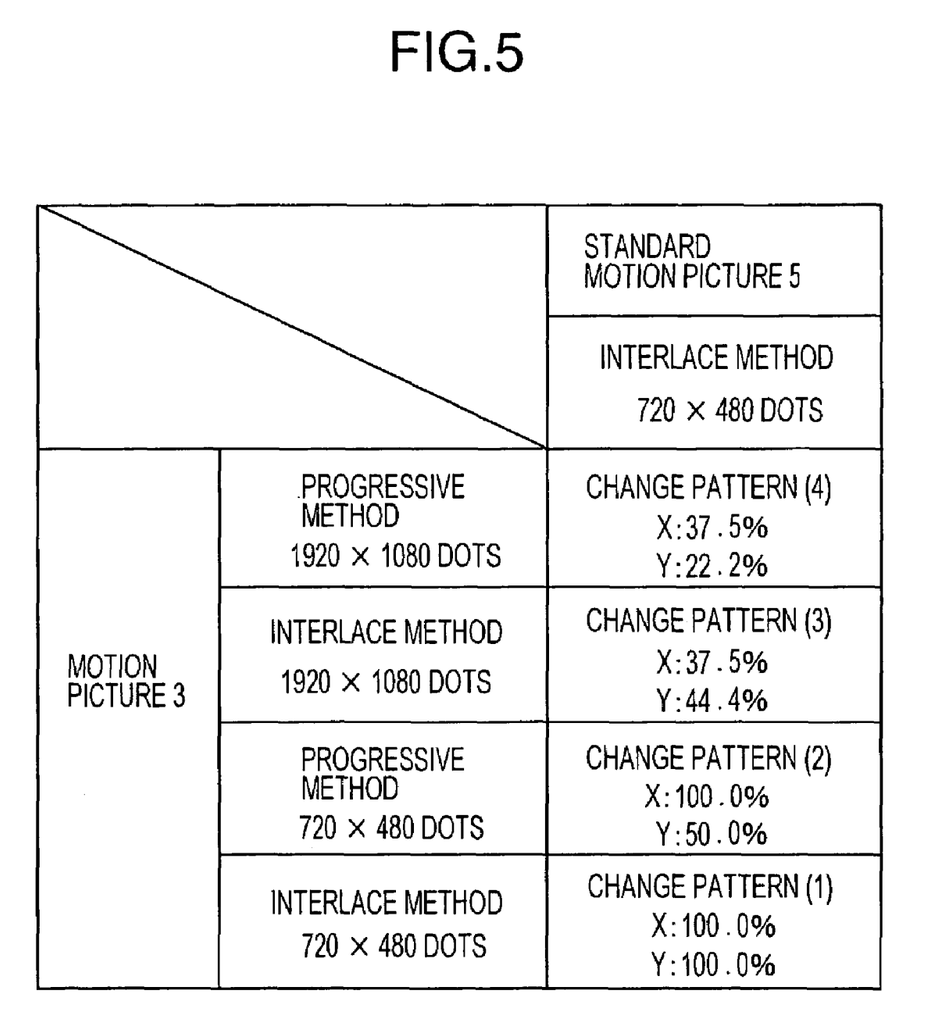
FIG. 5 is a diagram showing a list of scale factors in the horizontal (X) and vertical (Y) directions, which are employed to change motion picture 3, which are inputted into the watermark information embedding apparatus 2 in FIG. 1, into standard motion picture 5.
Figure 6:
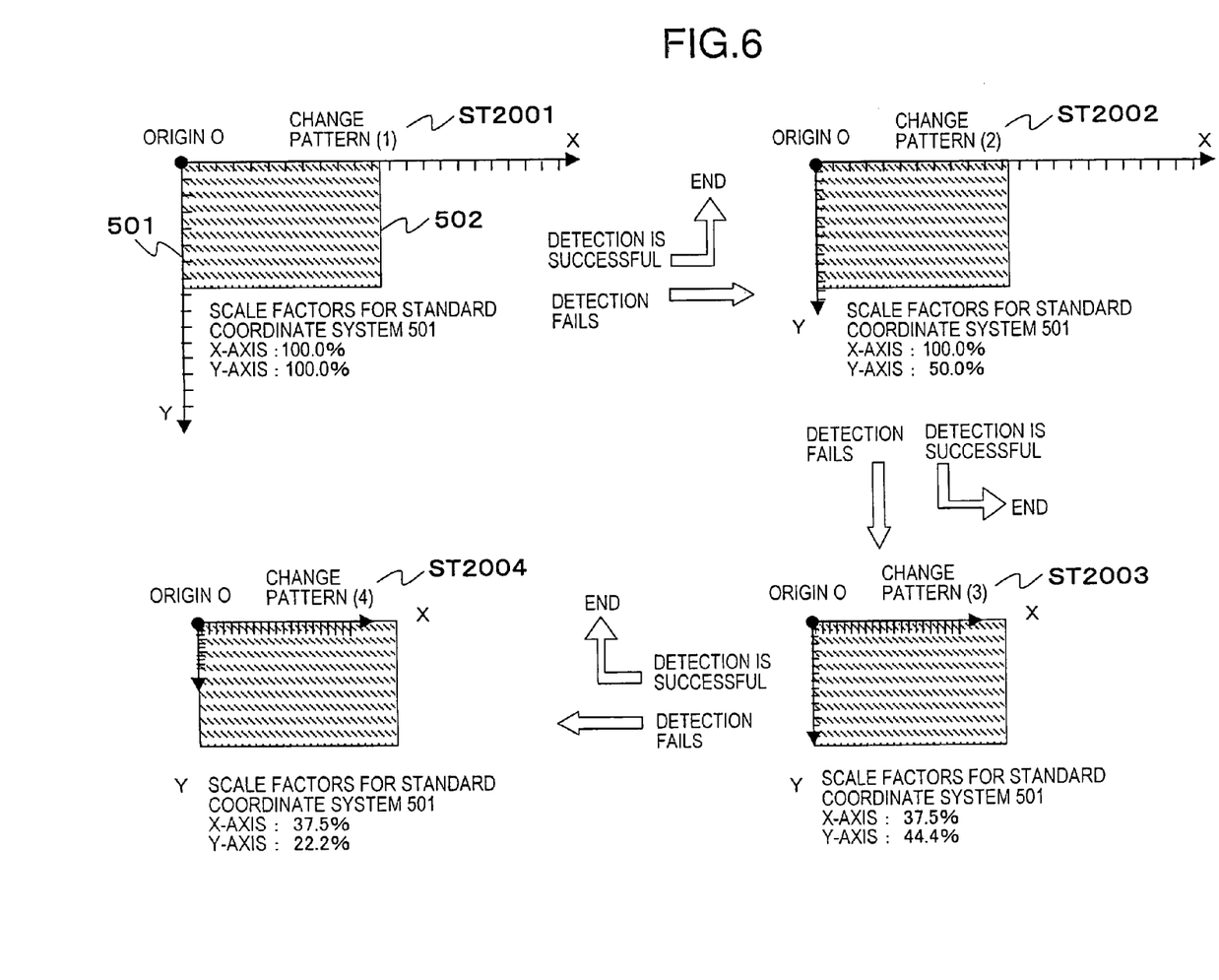
FIG. 6 is a diagram for explaining principles of extracting watermark information from field data of standard motion picture 5, in one embodiment of the present invention.

Thus, as shown in FIG. 6, the standard coordinate system 501 utilized by the watermark pattern to specify the embedding locations is scaled according to one of the change patterns (1) to (4) shown in FIG. 5. Then, using the scaled standard coordinate system 501, it is tried to detect the watermark information from the embedding locations specified by the watermark pattern. This process is repeated by exchanging the change pattern (within the change patterns (1) to (4) shown in FIG. 5) used for scaling the standard coordinate system 501, until the detection of the watermark information becomes successful (ST2001 to ST2004).

When the watermark information detection apparatus 1 detects the watermark information from the standard motion picture 5 in this way, the watermark information detection apparatus 1 outputs the information together with the decoded motion picture.

Next, the watermark information detection apparatus 1 of the present embodiment will be described in detail.

Figure 7:
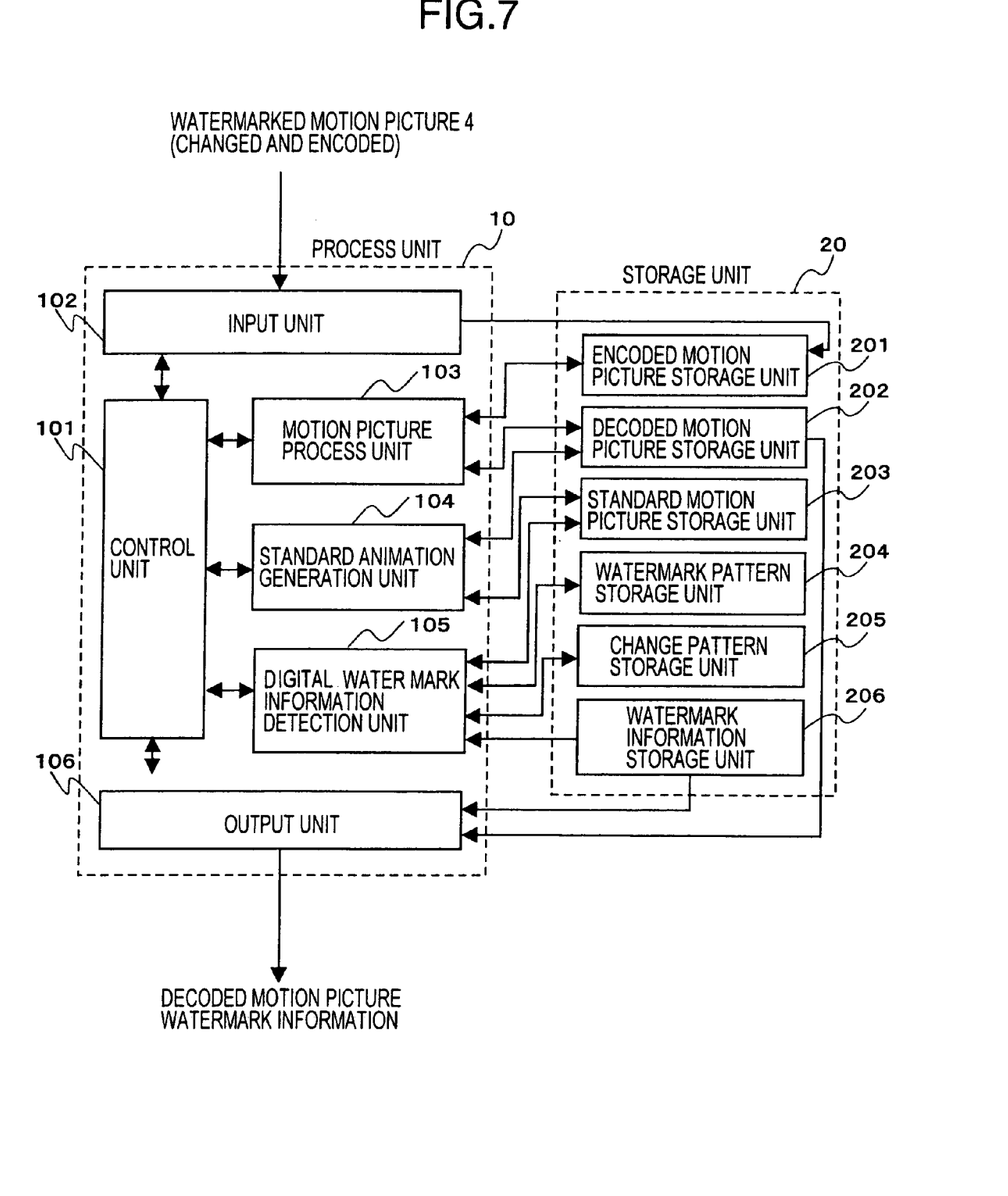
FIG. 7 is a block diagram showing a watermark information detection apparatus 1 to which one embodiment of the present invention is applied.

FIG. 7 is a block diagram showing the watermark information detection apparatus 1 to which the present embodiment is applied.

As shown in the figure, the watermark information detection apparatus of the present embodiment comprises a process unit 10 and a storage unit 20.

The process unit 10 comprises: a control unit 101 for integratedly controlling components of the watermark information detection apparatus 1; an input unit 102 serving for input of encoded watermarked motion picture 4; a motion picture process unit 103 for decoding the encoded watermarked motion picture 4 inputted into the input unit 102; a standard motion picture generation unit 104 for generating standard motion picture 5 from the watermarked motion picture 4 decoded by the motion picture process unit 103; a watermark information detection unit 105 for detecting watermark information from the standard motion picture generated by the standard motion picture generation unit 104; and an output unit 106 for outputting the motion picture decoded by the motion picture process unit 103 and the watermark information detected by the watermark information detection unit 105.

The storage unit 20 comprises: an encoded motion picture storage unit 201 for storing the encoded watermarked motion picture 4 inputted into the input unit 102; a decoded motion picture storage unit 202 for storing the watermarked motion picture 4 decoded by the motion picture process unit 103; a standard motion picture storage unit 203 for storing the standard motion picture generated by the standard motion picture generation unit 104; a watermark pattern storage unit 204 for storing a watermark pattern; a change pattern storage unit 205 for storing scale factors (the change patterns (1) to (4) shown in FIG. 5) applied to the standard coordinate system 501 utilized by the watermark pattern stored in the watermark pattern storage unit 204; and a watermark information storage unit 206 for storing the watermark information detected by the watermark information detection unit 105.

Figure 8:
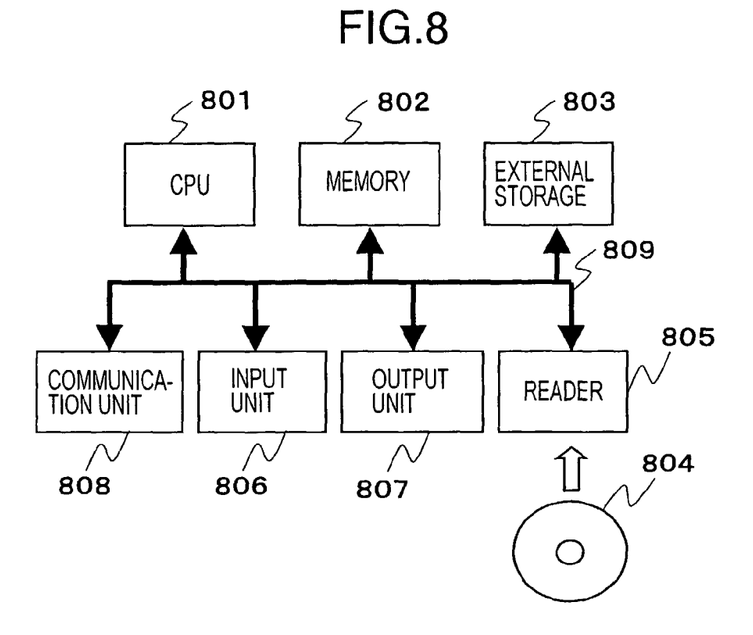
FIG. 8 is a diagram showing a hardware configuration of the watermark information detection apparatus 1 to which one embodiment of the present invention is applied.

The watermark information detection apparatus 1 of the above-described arrangement can be implemented in an ordinary computer system comprising, as shown in FIG. 8, a CPU 801, a memory 802, an external storage 803 such as an HDD, a reader 805 for reading information from a portable storage medium 804 such as a CD-ROM, DVD-ROM, or the like, an input unit 806 such as a keyboard and/or mouse, an output unit 807 such as a display, and a communication unit 808 for communicating with another apparatus through a network, with the CPU 801 executing a predetermined program loaded on the memory 802. This predetermined program may be downloaded from a storage medium 804 through the reader 805 or from the network through the communication unit 803 onto the external storage 803, and then loaded onto the memory 802 to be executed by the CPU 801. Or, the predetermined program may be loaded directly onto the memory from a storage medium 804 through the reader 805 or from the network through the communication unit 808, and then executed by the CPU 801. In this case, the memory 802, the external storage 803, and the like are used as the storage unit 20.

However, the watermark information detection apparatus 1 of the present embodiment is not limited to one implemented on a computer system by software. For example, the watermark information detection apparatus 1 may be implemented by hardware using an integrated logic IC such as an ASIC (Application Specific Integrated Circuit), an FPGA (Field Programmable Gate Array), or the like, or may be implemented by software using a DSP (Digital Signal Processor), or the like. Or, components specialized in specific uses, such as the motion picture process unit 103, the standard motion picture generation unit 104, the watermark information detection unit 105, and the like may be implemented by hardware using expansion boards mounted on a computer system, and the other general components may be implemented by software on the computer system.

Next, operation of the watermark information detection apparatus 1 of the above-described arrangement will be described.

Figure 9:
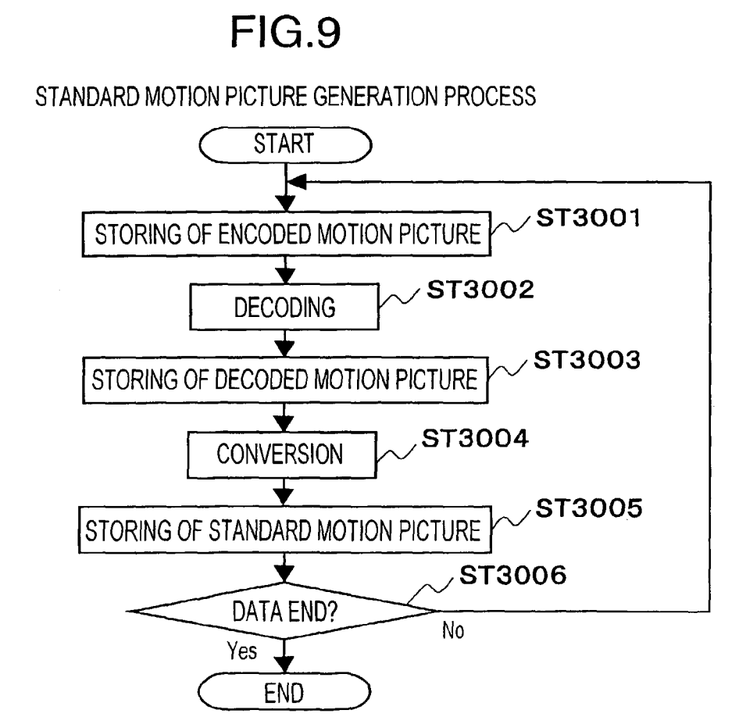
FIG. 9 is a flowchart for explaining standard motion picture generation process by the watermark information detection apparatus 1 to which one embodiment of the present invention is applied.

FIG. 9 is a flowchart for explaining standard motion picture generation process by the watermark information detection apparatus 1 to which the present embodiment is applied.

The control unit 101 receives encoded watermarked motion picture 4 through the input unit 102, and stores the received data into the encoded motion picture storage unit 201 (ST3001).

Next, under the control of the control unit 101, the motion picture process unit 103 reads the encoded watermarked motion picture 4 from the encoded motion picture storage unit 201, and decodes the read data (ST3002). Then, the motion picture process unit 103 stores the decoded watermarked motion picture 4 into the decoded motion picture storage unit 202 (ST3003).

Next, under the control of the control unit 101, the standard motion picture generation unit 104 generates standard motion picture 5 from the decoded watermarked motion picture 4 (ST3004), and stores the generated data into the standard motion picture storage unit 203 (ST3005). As described above, the standard motion picture 5 are generated by scaling each field of the watermarked motion picture 4 by scale factors in the horizontal and vertical directions determined from the scanning method and picture size of the watermarked motion picture 4 and the scanning method and picture size of the standard motion picture 5.

The control unit 101 integratedly controls the units of the watermark information detection apparatus 1 to continue the above-described process until the end of input of the encoded watermarked motion picture 4 into the input unit 102 (ST3006).

Figure 10:
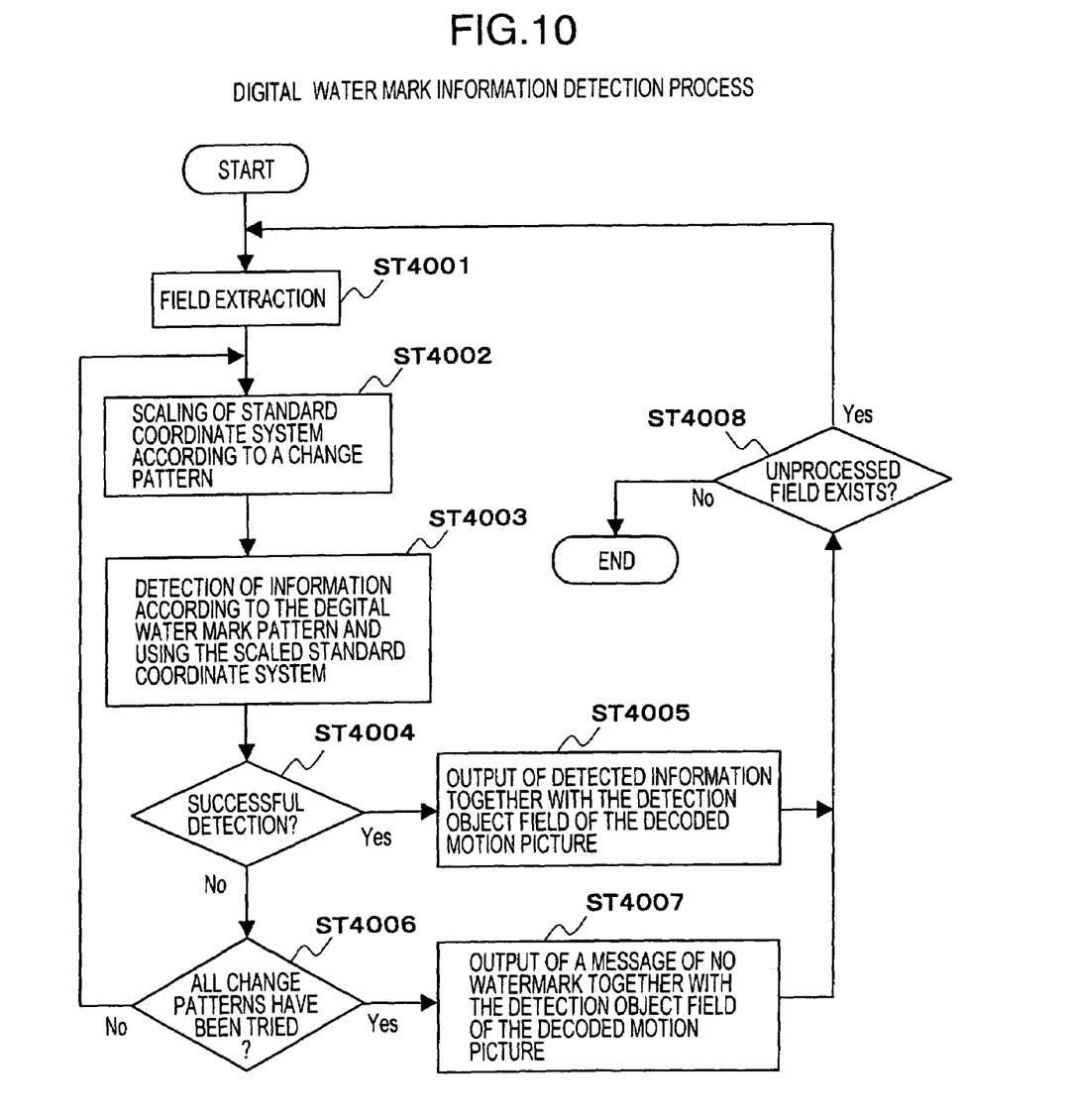
FIG. 10 is a flowchart for explaining watermark information detection process by the watermark information detection apparatus 1 to which one embodiment of the present invention is applied.

FIG. 10 is a flowchart for explaining watermark information detection process by the watermark information detection apparatus 1 to which the present embodiment is applied.

Under the control of the control unit 101, the watermark information detection unit 105 reads field data of one field in turn from the standard motion picture storage unit 203 (ST4001). Then, the watermark information detection unit 105 scales the standard coordinate system 501 employed by the watermark pattern stored in the watermark pattern storage unit 204, according to one change pattern stored in the change pattern storage unit 205 (ST4002).

Next, the watermark information detection unit 105 tries to detect the watermark information from the embedding locations (which are specified by the watermark pattern stored in the watermark pattern storage unit 204) in the read field data in the scaled standard coordinate system 501, according to the extraction principles described referring to FIG. 2 (ST4003).

When the detection of the watermark information is successful (ST4004), the watermark information detection unit 105 stores the detected watermark information into the watermark information storage unit 206. As a result, the control unit 101 outputs the watermark information together with the field data that are stored in the decoded motion picture storage unit 202 and that correspond to the field data of the standard motion picture 5 read in ST4001, through the output unit 106 (ST4005).

On the other hand, when the watermark information detection unit 105 fails in detection of watermark information (ST4004), the watermark information detection unit 105 judges whether all the change patterns stored in the change patter storage unit 205 have been used to scale the standard coordinate system 501 for detecting watermark information (ST4006). When there is a change pattern for which detection of watermark information is not tried, the flow returns to ST4002 to try detection of watermark information using the standard coordinate system 501 scaled according to that change pattern (ST4002, ST4003). On the other hand, when detection of watermark information has been tried with respect to all the change patterns, the watermark information detection unit 105 stores a message to the effect that watermark information is not embedded, into the watermark information storage unit 206. As a result, the control unit 101 outputs this message together with the field data that are stored in the decoded motion picture storage unit 202 and that correspond to the field data of the standard motion picture 5 read in ST4001, through the output unit 106 (ST4007).

Then, the control unit 101 examines whether unprocessed field data are stored in the standard motion picture storage unit 203 (ST4008). When unprocessed field data are stored, the flow returns to ST4001 to continue the process.

Hereinabove, one embodiment of the present invention has been described.

In the present embodiment, the watermark information detection unit 1 converts decoded watermarked motion picture 4 into the standard motion picture 5 (of the 720×480 dot interlace method) having the smallest data size among the kinds of motion picture assumed by the present embodiment. At the same time, the standard coordinate system 501 utilized for specifying the embedding locations of the watermark pattern is scaled so as to detect watermark information from the standard motion picture 5. Accordingly, the memory capacity used for storing field data with the intention of detecting watermark information (i.e., the capacity of the standard motion picture storage unit 203) can be made smaller. And, when, for example, dedicated hardware including the watermark information detection unit 105 and the standard motion picture storage unit 203 is used, the size of the hardware can be made smaller.

Further, in the present invention, decoded watermarked motion picture 4 is converted into standard motion picture 5 before detection of watermark information. Accordingly, the number of change patterns that should be tried for scaling the standard coordinate system 501 becomes same as the kind of motion picture 3 inputted into the watermark information embedding apparatus 2 (see FIG. 5). Accordingly, the number of change patterns to be tried becomes smaller in comparison with the number of change patterns that should be tried for scaling the standard coordinate system 501 when watermark information is detected directly from encoded watermarked motion picture 4 that may employ various scanning methods and picture sizes (see FIG. 4). Thus, the processing time required for detecting watermark information can be made shorter.

The present invention is not limited to the above-described embodiment, and can be modified variously within the gist of the invention.

For example, although, in the above embodiment, standard motion picture 5 has the picture size and scanning method of the 720×480 dot interlace method, the present invention is not limited to this. However, in order to reduce the memory capacity that is used for storing field data with the intention of detecting watermark information, it is favorable to set the picture size and scanning method of standard motion picture 5 such that data size of standard motion picture 5 becomes smaller.

Further, in the above-described embodiment, detection of watermark information is tried for data of each field as a constituent of standard motion picture 5. However, when it is possible to specify in advance fields in which watermark information is embedded (for example, when watermark information is embedded at predetermined field intervals), detection of the watermark information may be tried with respect to data of those field only.

Further, in the above-described embodiment, the watermark information detection process described referring to FIG. 10 is performed for all the field data that are objects of detecting watermark information. However, the present invention is not limited to this. When there is a weak possibility that motion picture of different scanning methods or different picture sizes are synthesized in the distribution process to generate new motion picture, the watermark information detection process may be modified as follows. Namely, detection of watermark information is performed according to the flow shown in FIG. 10 with respect to data of a plurality of leading fields. And, when watermark information is detected using the standard coordinate system 501 scaled according to the same change pattern a plurality of times successively, the standard coordinate system 501 scaled by this change pattern is used for detecting watermark information from the following field data.

Further, in the above-described embodiment, when it is assured that the scanning method and picture size of watermarked motion picture are not changed in the distribution process, the watermark information detection process may be performed as follows instead of the flow shown in FIG. 10. Namely, watermark information is detected from the fields of standard motion picture 5 according to an watermark pattern, using the standard coordinate system 501 scaled by the scale factors in the horizontal (X) and vertical (Y) directions used for converting decoded watermarked motion picture 4 into standard motion picture 5, i.e., the scale factors of changing the scanning method and picture size in the time of embedding watermark information in motion picture 3 into the scanning method and picture size of standard motion picture.

Further, the above-described embodiment assumes that watermarked motion picture 4 may be changed in its scanning method and picture size in the distribution process. However, the present invention can be applied similarly to other geometric transformation such as rotation or the like. As a technique of correctly detecting watermark information from field data of standard motion picture 5 obtained by converting watermarked motion picture 4 that have been subjected to geometric transformation such as rotation or the like, a technique described in Japanese Unexamined Patent Laid-Open No. 2001-053955 may be employed. Namely, the standard coordinate system 501 is transformed according to supposed geometric transformation. Then, the transformed standard coordinate system 501 is used to detect watermark information from field data of standard motion picture 5. This process is repeated by changing a transformation rate of the standard coordinate system until watermark information is detected correctly.

The kind of transformation is determined according to the supposed geometric transformation. For example, when the supposed geometric transformation is rotation, the standard coordinate system 501 is rotated by a certain angle of rotation. And, the rotated standard coordinate system 501 is used to detect watermark information from field data of standard motion picture 5. This process is repeated by changing the angle of rotation of the standard coordinate system 501 until watermark information can be detected correctly.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A watermark information detection method for detecting watermark information from a motion picture of any scanning method and having any picture size, the watermark information being embedded in said motion picture by changing pixel blocks of fields constituting said motion picture positioned at predetermined locations in a certain coordinate system, the method comprising:
   a conversion step for converting said motion picture into a standard motion picture arranged according to a predetermined scanning method and having a predetermined picture size;
   a coordinate transformation step for transforming the certain coordinate system into a transformed coordinate system with scale factors determined from the scanning method and picture size of said motion picture at a time of embedding the watermark information in said motion picture and the scanning method and picture size of said standard motion picture; and
   a detection step for detecting the watermark information from fields constituting said standard motion picture by using said transformed coordinate system including specifying the pixel blocks positioned at the predetermined locations in said transformed coordinate system and a step of comparing the data of the specified pixel blocks with reference data and judging whether the watermark information is embedded in said pixel blocks.

2. The watermark information detection method according to claim 1, further comprising:
   a step of assuming a plurality of scanning methods and/or picture sizes at a time of embedding the watermark information in said motion picture;
   a step of executing the following steps until it is confirmed, at the detection step, that the watermark information is embedded in said pixel blocks;
   a step of selecting one scanning method and/or one picture size out of the assumed scanning methods and/or picture size;
   a step of, in said coordinate transformation step, determining scale factors according to the selected method and/or picture size; and
   a step of transforming the certain coordinate system into a transformed coordinate system according to the determined scale factors.

3. The watermark information detection method according to claim 2, wherein:
   said coordinate transformation step includes a step of transforming said certain coordinate system by scaling said certain coordinate system with scale factors that are determined from scale factors employed for converting fields of said any scanning method into fields of said predetermined scanning method and scale factors employed for converting fields of said any picture size into fields of said predetermined picture size.

4. The watermark information detection method according to claim 1, wherein:
   said conversion step includes a step of, when said any scanning method is a progressive method and said predetermined scanning method is an interlace method, performing conversion from the motion picture of said any scanning method into the motion picture of said predetermined scanning method by reducing a vertical direction of the fields of the motion picture of said any scanning method to half.

5. A computer readable medium encoded with a computer readable program for causing the computer to detect watermark information from a motion picture of any scanning method and having any picture size, said watermark information being embedded in said motion picture, by changing pixel blocks of fields constituting said motion picture positioned at predetermined locations in a certain coordinate system, wherein said program is read and executed by a computer to make said computer perform:
   a conversion step for converting said motion picture into a standard motion picture arranged according to a predetermined scanning method and having a predetermined picture size;
   a coordinate transformation step for transforming the certain coordinate system into a transformed coordinate system with scale factors determined from the scanning method and picture size of said motion picture at a time of embedding the watermark information in said motion picture and the scanning method and picture size of said standard motion picture; and
   a detection step for detecting the watermark information from fields constituting said standard motion picture by using said transformed coordinate system including specifying the pixel blocks positioned at the predetermined locations in said transformed coordinate system and a step of comparing the data of the specified pixel blocks with reference data and judging whether the watermark information is embedded in said pixel blocks.

6. A watermark information detection apparatus for detecting watermark information from motion picture of any scanning method and having any picture size, with the watermark information being embedded in said motion picture by changing pixel blocks of fields constituting said motion picture positioned at predetermined locations in a certain coordinate system, comprising:
   a conversion means for converting said motion picture into a standard motion picture arranged according to a predetermined scanning method and having a predetermined picture size;
   a coordinate transformation means for transforming the certain coordinate system into a transformed coordinate system with scale factors determined from the scanning method and picture size of said motion picture at a time of embedding the watermark information in said motion picture and the scanning method and picture size of said standard motion picture; and a detection means for detecting the watermark information from fields constituting said standard motion picture by using said transformed coordinate system including specifying the pixel blocks positioned at the predetermined locations in said transformed coordinate system and a step of comparing the data of the specified pixel blocks with reference data and judging whether the watermark information is embedded in said pixel blocks.

* * * * *